US005499749A

United States Patent [19]
Conant

[11] Patent Number: 5,499,749
[45] Date of Patent: Mar. 19, 1996

[54] BULK MATERIAL MEASURING AND DISPENSING SYSTEM

[75] Inventor: Mark Conant, Derry, N.H.

[73] Assignee: Built On Technology, East Derry, N.H.

[21] Appl. No.: 187,633

[22] Filed: Jan. 26, 1994

[51] Int. Cl.⁶ .................................................. G01F 11/10
[52] U.S. Cl. ........................ 222/233; 222/363; 222/368; 222/181.1
[58] Field of Search .................................. 222/344, 352, 222/368, 362–365, 226, 233, 235, 236, 239, 181.1

[56] References Cited

U.S. PATENT DOCUMENTS

| | | | |
|---|---|---|---|
| 480,146 | 8/1882 | Souder . | |
| 817,727 | 4/1906 | Sletto . | |
| 875,948 | 1/1908 | Racovillat | 222/452 X |
| 1,291,759 | 1/1919 | Bunnell . | |
| 1,633,207 | 6/1927 | Hanson | 222/363 X |
| 1,639,370 | 8/1927 | Flegel . | |
| 1,728,526 | 9/1929 | Brunhoff | 222/363 X |
| 2,321,869 | 6/1943 | Stanyer | 222/363 X |
| 2,389,901 | 11/1945 | Gillen | 222/363 X |
| 2,584,781 | 2/1952 | Beatty | 222/362 |
| 2,805,799 | 4/1954 | Hileman . | |
| 2,841,312 | 7/1958 | Bello | 222/363 X |
| 4,266,695 | 5/1981 | Ruperez | 222/363 X |
| 4,448,331 | 5/1984 | Millette et al. | 222/363 X |
| 4,660,960 | 4/1987 | Fukunaga | 355/3 |
| 4,860,930 | 8/1989 | Tu | 222/363 X |
| 4,942,432 | 7/1990 | Mort | 355/260 |
| 4,998,648 | 3/1991 | Contreras | 222/370 |
| 5,111,976 | 5/1992 | Ban | 222/485 |

OTHER PUBLICATIONS

Beacon Toner Dispenser Product Literature 1 page.
Per-Fil Industries Product Literature 5 pages.

*Primary Examiner*—Kevin P. Shaver
*Attorney, Agent, or Firm*—Daniel J. Bourque; Anthony G. M. Davis; Michael Bujold

[57] ABSTRACT

A bulk material measuring and dispensing system includes a hopper assembly containing a bulk material coupled to a volumetric measuring and dispensing device, for measuring a predetermined volume of the bulk material and dispensing the predetermined volume of the bulk material. A dispensing mechanism is coupled to the volumetric measuring and dispensing device, for receiving and measuring a predetermined volume of bulk material in one position, and for dispensing the bulk material into a bulk material dispensing passageway another position. The volumetric measuring and dispensing device may include a rotatably mounted cylindrical member having a measuring chamber which receives and measure a predetermined volume of the bulk material and rotates to dispense the predetermined volume of bulk material. The measuring and dispensing system further includes a first air vent including at least one vent tube fluidly coupling the measuring chamber to a hopper assembly, for displacing air from the measuring chamber when bulk material is received in the measuring chamber. A second air vent including at least one vent tube extending from and fluidly coupling the dispensing passageway to the measuring chamber for displacing air in a bulk material receiver may also be included. The measuring chamber and air vents provide a bulk material measuring and dispensing system which is closed and prevents bulk material from escaping and contaminating the area around the system, while facilitating the flow of bulk material through the system.

18 Claims, 3 Drawing Sheets

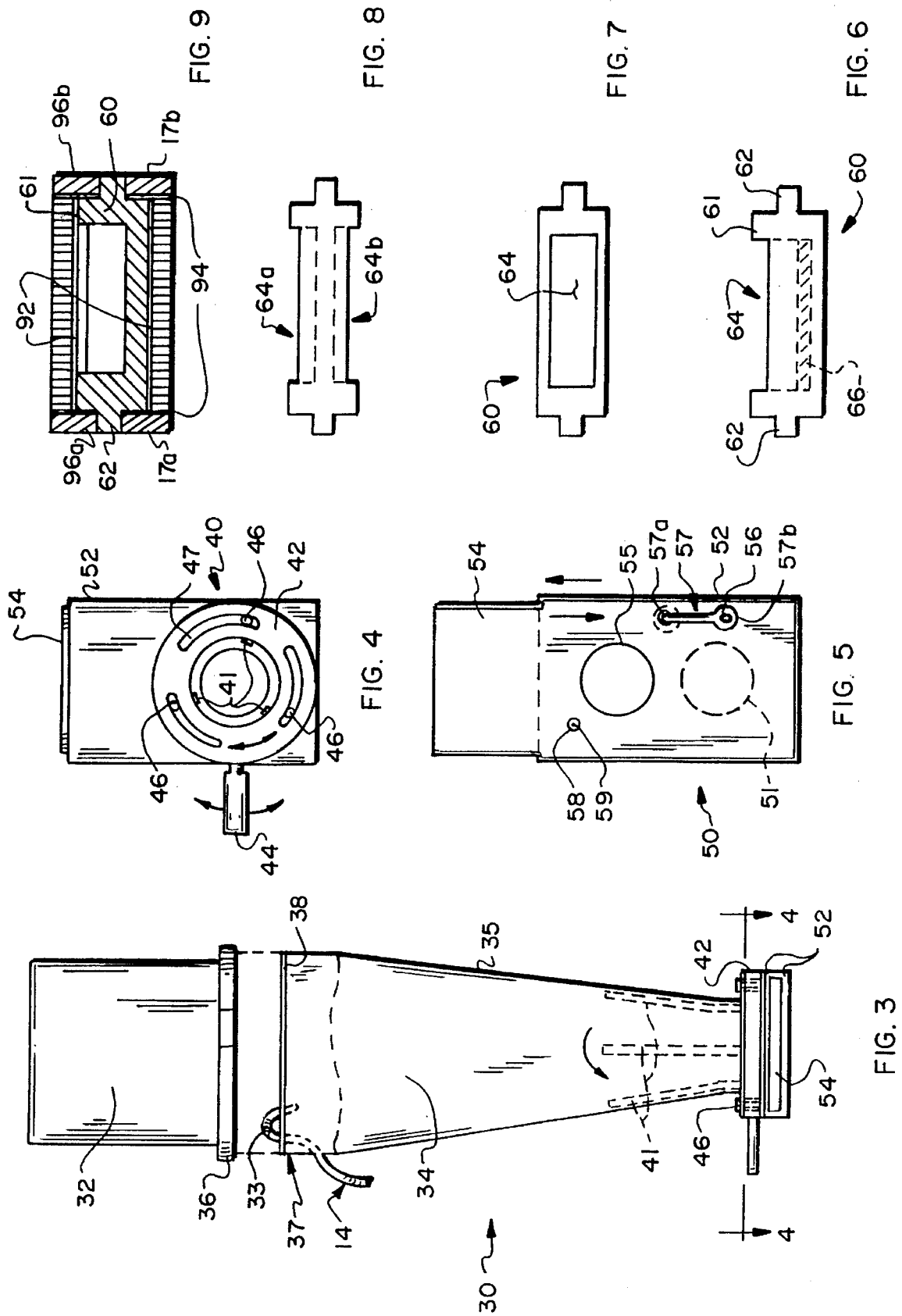

BULK MATERIAL MEASURING AND DISPENSING SYSTEM

FIELD OF THE INVENTION

This invention relates to a material measuring and dispensing system and in particular, to a volumetric measuring and dispensing system for a bulk particulate material having a high density.

BACKGROUND OF THE INVENTION

Measuring and dispensing devices are well known in the art. However, most such measuring and dispensing devices are not suitable for use with a bulk material having a high density such as toner used in a laser printer cartridge or copier machines. The prior art devices which are used to fill cartridges with toner also have many disadvantages and are not suitable for efficiently recycling laser printer cartridges.

Measuring and dispensing devices such as those disclosed in U.S. Pat. Nos. 1,291,759; 480,146; and 817,727, are for use with materials such as coffee, snuff and other such loosely packed powdered materials. Such devices are not suitable for measuring and dispensing a bulk material such as toner because of the characteristics of such a material having both fine particles and a high density. A material having such a high density will not flow easily from the hopper to the measuring chambers in the prior art devices without displacement of the air in the measuring chamber.

Furthermore, measuring and dispensing a bulk material such as toner can be messy and requires a measuring and dispensing system which is sufficiently closed to contain the bulk material and prevent the bulk material from spilling out of the system or contaminating parts of the system. The dispensed materials such as coffee and snuff which are dispensed with the prior art measuring and dispensing devices mentioned above do not cause the same concerns as high density and contaminating materials such as toner. Therefore, the prior art devices are not designed to allow the material to easily flow while preventing contamination by the material into the measuring and dispensing system itself as well as into the outside area around the system.

In the prior art, there are known systems and methods for recycling laser printer cartridges by dispensing toner into the cartridge. However, problems are often encountered with such methods and systems for replacing the toner in a cartridge. Recycling toner by using small bottles containing the exact amount of toner for the cartridge is wasteful and inefficient. The bulk loading machines available in the prior art also present problems. Such bulk loading machines are often big and expensive. Also, bulk loading machines in the prior art often do not allow the bulk material such as toner to be precisely volumetrically measured prior to dispensing. Further, different cartridges often take different types of toner and the big bulk material loading machines available in the prior art would be difficult to adapt to measure and dispense different types and volumes of toner into the various cartridges.

One prior art system for dispensing toner uses an auger mechanism to cause the toner to flow from a hopper to a toner cartridge and provides a vent from a spout to the hopper. This system is more costly and complex than a simple and efficient measuring and dispensing system which primarily uses gravity to cause the toner to flow. Further, the vent used on the prior art device would not maximize the flow of toner in a measuring and dispensing device which does not use an auger mechanism to cause toner to flow.

Accordingly, what is needed is a bulk material measuring and dispensing system which involves a simple, cost efficient mechanism and can measure and dispense a predetermined volume of bulk material having a high density, such as toner. Such a device must provide proper venting for the high density bulk material to easily flow from a container to the volumetric measuring device and then to the cartridge or receiver, while preventing the bulk material from contaminating the device and the surrounding area. Further, such a device should be adaptable for different types of toner.

SUMMARY OF THE INVENTION

This invention features a bulk material measuring and dispensing system. The measuring and dispensing system includes a volumetric measuring and dispensing device having a measuring chamber with a predetermined volume, for measuring a predetermined volume of bulk material and for dispensing that predetermined amount of bulk material. A bulk material dispensing passageway, typically in the form of a tapered spout, is positioned below the volumetric measuring and dispensing device, for receiving the bulk material from the measuring chamber and for dispensing the bulk material into a bulk material receiver.

A hopper assembly which includes a hopper is coupled to the top region of the volumetric measuring and dispensing device for holding the bulk material and positioning the bulk material above the volumetric measuring and dispensing device. A dispensing mechanism is coupled to the volumetric measuring and dispensing device and is movable between a first and a second position. In the first position, the dispensing mechanism allows the measuring chamber to receive and volumetrically measure the bulk material. In the second position, the dispensing mechanism allows the measuring chamber to dispense the volumetrically measured bulk material into the bulk material dispensing passageway.

In the preferred embodiment, a first or measuring chamber air vent extends from and fluidly couples the measuring chamber to an exterior region of the measuring chamber to facilitate displacement of air in the measuring chamber when bulk material is received in the measuring chamber.

In the preferred embodiment, the bulk material measuring and dispensing system includes a second or dispensing passageway air vent which extends from and fluidly couples the bulk material dispensing passageway to the measuring chamber, to facilitate displacement of air in the bulk material receiver when bulk material is dispensed into the receiver. Also in the preferred embodiment, the first air vent includes one or more tubes which fluidly couple the measuring chamber to the hopper assembly. The one or more first air vent tubes include a first end coupled to the hopper and extending to a region inside the hopper which is above a level of the bulk material and a second end which is fluidly coupled to the measuring chamber. The second air vent includes one or more tubes which fluidly couple the dispensing passageway to the measuring chamber.

In the preferred embodiment, the hopper assembly is removably coupled to the volumetric measuring and dispensing device and includes a bulk material container which is removably coupled to the hopper. In this embodiment, the hopper assembly further includes an agitator and a slide closure. The agitator facilitates the flow of bulk material from the hopper to the volumetric measuring and dispensing device. The slide closure is movable between an open and a closed position. In the closed position, the slide closure retains the bulk material in the hopper assembly and in the open position, the slide closure allows the bulk material to enter the volumetric measuring and dispensing device.

In the preferred embodiment, the volumetric measuring and dispensing device includes a cylindrical bulk material receiver member rotatably mounted in the volumetric measuring and dispensing device. The measuring chamber is formed in the cylindrical member and the cylindrical member is rotatable by the dispensing mechanism to position the measuring chamber into the first and second positions. In an alternative embodiment, the cylindrical bulk material receiver member includes two measuring chambers so that a first measuring chamber may receive and volumetrically measure bulk material while a second measuring chamber may dispense a predetermined volume of bulk material.

The preferred embodiment of the present invention further includes a bulk material receiver base, for holding the bulk material receiver proximate the bulk material dispensing passageway. The dispensing passageway may be a tapered spout positioned beneath the volumetric measuring and dispensing device and the receiver base may be spring-loaded to push the bulk material receiver against the tapered spout.

The present invention further includes a method for measuring and dispensing bulk material using the bulk material measuring and dispensing system. First, the hopper assembly containing bulk material is coupled to the volumetric measuring and dispensing device. Second, the bulk material is released from the hopper assembly into a measuring chamber in the volumetric measuring and dispensing device. Third, air from the measuring chamber is displaced to the hopper assembly. Fourth, a predetermined volume of the bulk material is measured by the measuring chamber, and finally, the predetermined volume of bulk material is dispensed into a bulk material receiver.

In the preferred embodiment, the steps of measuring and dispensing predetermined volumes of bulk material are repeated until all of the bulk material is dispensed from the hopper assembly. In another preferred embodiment, a plurality of hopper assemblies may be consecutively coupled to the volumetric measuring and dispensing device for measuring and dispensing different types of bulk material.

DESCRIPTION OF THE DRAWINGS

These and other features and advantages of the present invention will be better understood by reading the following detailed description, taken together with the drawings wherein:

FIG. 3 is a front view of the hopper assembly including the agitator and slide closure assemblies according to the present invention;

FIG. 4 is a top view of the agitator according to the present invention;

FIG. 5 is a top view of the slide closure assembly according to the present invention;

FIG. 6 is a side view of the cylindrical bulk material receiver member having a measuring chamber according to the present invention;

FIG. 7 is a top view of the cylindrical bulk material receiver member and measuring chamber according to the present invention;

FIG. 8 is a side view of a cylindrical bulk material receiver member having two measuring chambers according to another embodiment of the present invention; and FIG. 9 is a cross-sectional view of a volumetric measuring and dispensing device according to the present invention.

DETAILED DESCRIPTION OF THE PREFERRED EMBODIMENT

Figure 1:
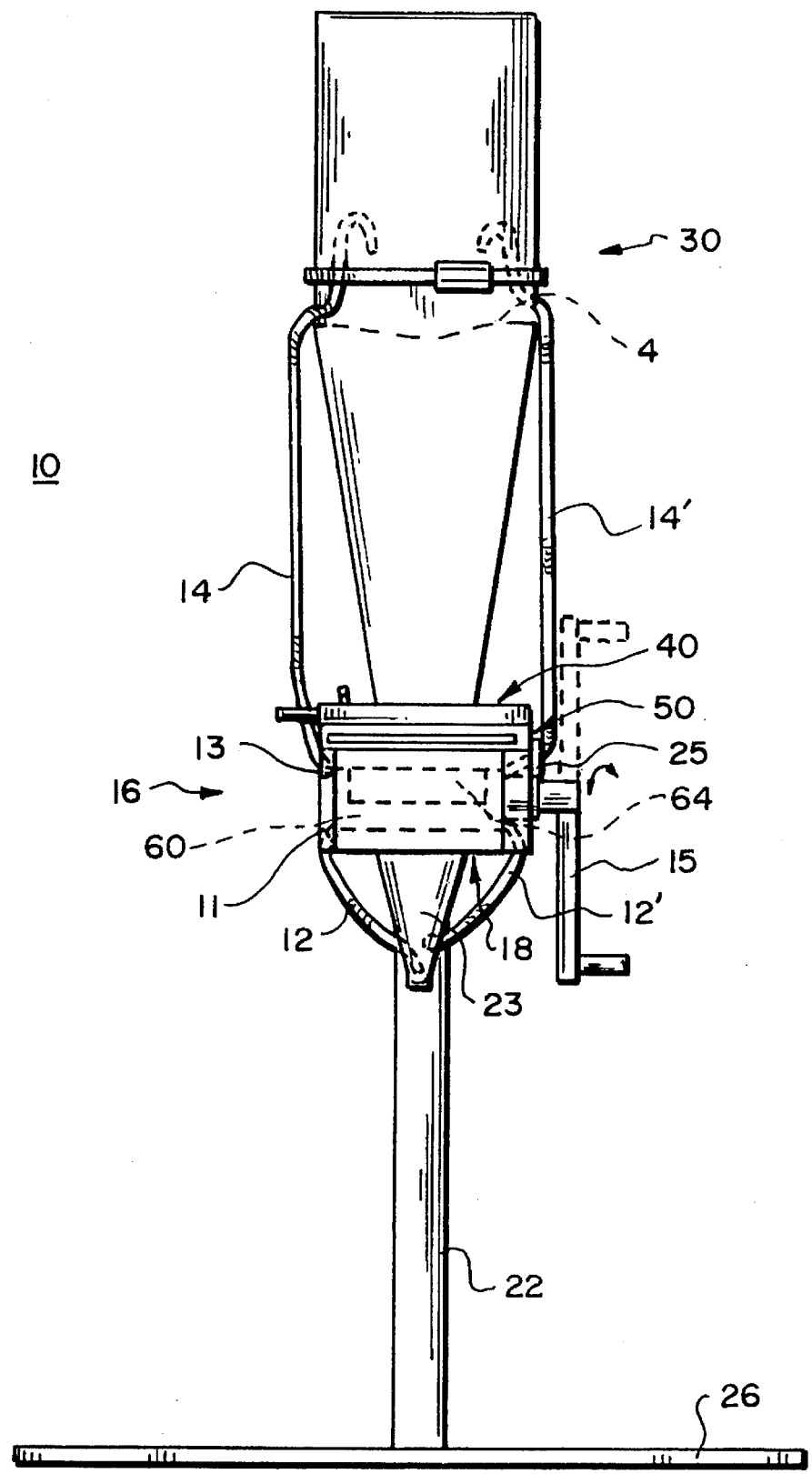
FIG. 1 is a front view of the bulk material measuring and dispensing system according to the present invention.
Figure 2:
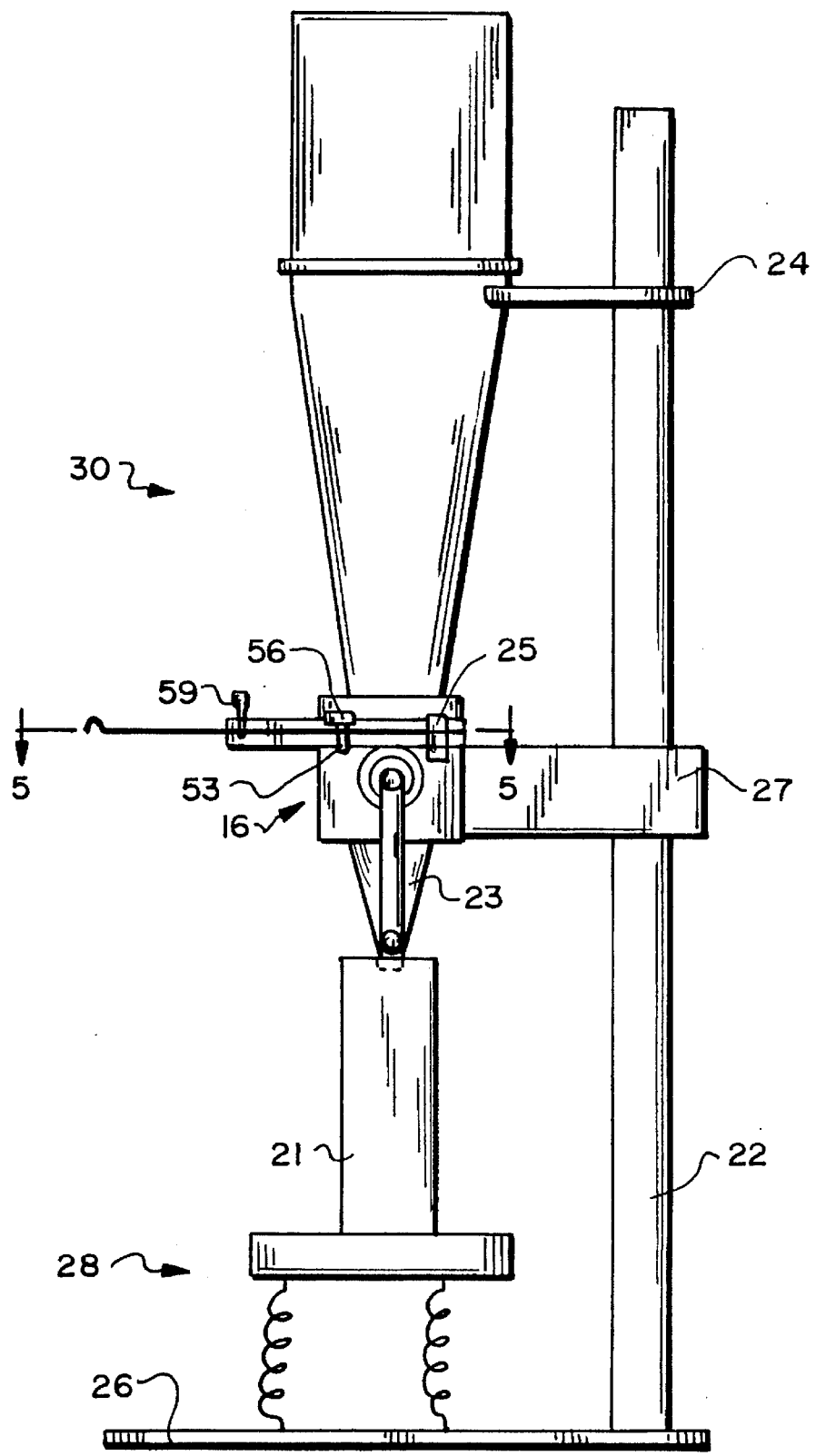
FIG. 2 is a side view of the bulk material measuring and dispensing system according to the present invention.

The bulk material measuring and dispensing system 10, FIGS. 1 and 2, according to the present invention includes a hopper assembly 30 coupled to a volumetric measuring and dispensing device 16 and a bulk material dispensing passageway 23, for volumetrically measuring and dispensing a bulk material consisting of fine particulates having a high density. The bulk material 4 after being volumetrically measured by the measuring and dispensing device 16 is dispensed through the bulk material dispensing passageway 23 into a bulk material receiver 21. The bulk material receiver 21 is positioned beneath the bulk material dispensing passageway 23 and held against the passageway 23 manually or by a spring-loaded bulk material receiver base 28 (FIG. 2). Preferably, the bulk material dispensing passageway may be formed as a tapered spout.

In the preferred embodiment, the bulk material 4 is a toner and the bulk material receiver is toner cartridge for a laser printer. In this preferred embodiment, the bulk material measuring and dispensing system is used to recycle laser printer cartridges by replacing the toner in the cartridge.

The bulk material measuring and dispensing system 10 is supported vertically by a vertical support 22, such as a pipe, which is mounted to a base 26. A first support bracket 24 supports and holds the hopper assembly 30 in place when the hopper assembly is coupled to the volumetric measuring and dispensing device 16. A second support bracket 27 mounted to the vertical support 22 supports the volumetric measuring and dispensing device 16 and dispensing passageway 23 above the bulk material receiver 21 (see FIG. 2).

The volumetric measuring and dispensing device 16 includes a measuring chamber 64 formed in cylindrical member 60 and a dispensing mechanism 15 coupled to the volumetric measuring and dispensing device. The measuring chamber 64 is moveable between a first position allowing the measuring chamber to receive and volumetrically measure the bulk material and a second position for allowing the measuring chamber 64 to dispense the volumetrically measured material to the bulk material dispensing passageway 23.

In the preferred embodiment, the volumetric measuring and dispensing device 16 includes a block 18 and the measuring chamber 64 is formed in a cylindrical bulk material receiver member 60 rotatably mounted in block 18, as will be discussed in greater detail below. In this preferred embodiment, the dispensing mechanism 15 is an armor crank which is coupled to the cylindrical bulk material receiver member 60 for rotating the cylindrical member 60 from the first position where the dispensing mechanism 15 is in an upright position and the measuring chamber 64 is facing the hopper assembly 30 for receiving the bulk material 4, to the second position where the dispensing mechanism 15 is in a downright position and the measuring chamber 64 faces the bulk material dispensing passageway 23 for dispensing the bulk material.

Prior to measuring and dispensing the bulk material 4, the hopper assembly 30 is removably coupled to the volumetric measuring and dispensing device 16 (see FIG. 1). In a preferred embodiment, the hopper assembly 30 is removably coupled to the volumetric measuring dispensing device 16 by means of a spring latch or buckle 25. Before measuring and dispensing of the bulk material 4, an agitator assembly 40 helps the bulk material 4 to flow from the hopper assembly 30 through a closure assembly 50, as described in greater detail below. Thereafter, the bulk material 4 is volumetrically measured by the volumetric measuring and dispensing device 16 when the measuring chamber 64 receives a predetermined volume of the bulk material 4.

The flow of bulk material 4 into the measuring chamber 64 is facilitated by displacing the air in the measuring chamber 64 through a first or measuring chamber air vent which includes a passageway 13 formed in the volumetric measuring and dispensing device 16 which fluidly couples the measuring chamber 64 to an exterior region of the measuring chamber 64 (see FIG. 1). In one embodiment, the first air vent further includes at least a first tube 14 which fluidly couples the measuring chamber 64 to the hopper assembly 30, as will be discussed in greater detail below.

After a predetermined volume of bulk material 4 has been received in the measuring chamber 64, the predetermined volume of bulk material 4 is dispensed through the bulk material dispensing passageway 23 when the measuring chamber 64 is in the second position. To facilitate the flow of bulk material from the dispensing passageway 23 into a bulk material receiver 21, the air in the bulk material receiver 21 may be displaced by means of a second or dispensing passageway air vent. In one embodiment, the second air vent includes at least a first tube 12 having one end positioned in the bulk material dispensing passageway 23 and a second end fluidly coupled through a passageway 11 in the volumetric measuring and dispensing device 16 to the measuring chamber 64 which is in the second position.

In the preferred embodiment, the first (measuring chamber) and second (dispensing passageway) air vents include second tubes 14', 12' opposite the first and second air vent first tubes 14, 12 respectively, to ensure that the flow of dense bulk material 4 from the hopper assembly 30 to the measuring chamber 64 and then to the bulk material receiver 21 (FIG. 1) is consistent to achieve consistent dispensing of the toner.

The first air vent second tube 14' is fluidly coupled from the measuring chamber 64 to the hopper assembly 30 in the same manner as the first tube 14. The second air vent second tube 12' is fluidly coupled from the dispensing passageway 23 to the measuring chamber 64 in the same manner as the second air vent first tube 12. The second tubes 12', 14' are positioned opposite the first tubes 12, 14 to provide the measuring and dispensing device 16 with a balanced venting system which is preferred due to the length of the cylindrical bulk material receiver member 60 and measuring chamber 64 and the density of the toner material, to ensure consistent toner dispensing.

In the preferred embodiment, the hopper assembly 30, FIG. 3, includes a hopper 34 and a bulk material container 32, such as a bucket, coupled to the hopper 34. The hopper 34 has a truncated conical shape with a taper 35. The taper 35 is at an angle in the range of 65 degrees to 75 degrees which will maximize the flow of the bulk material 4 through the hopper 34. The hopper 34 is preferably made of an aluminum material and may further have a teflon coating which is baked on the inside surface of the hopper 34 and is several millimeters thick. The teflon coating also maximizes the flow of a bulk material 4 through the hopper 34. The hopper also has a sealing ring 38 positioned around an upper rim 37 of the hopper 34 for sealing the coupled bulk material container 32 to the hopper 34.

In the preferred embodiment, the hopper assembly is assembled by opening a container of bulk material 32 and placing the inverted hopper 34 onto the bulk material container 32 so that the sealing ring 38 is fitted with the bulk material container 32. A lever locking clamp ring 36 removably couples and seals the hopper 34 to the bulk material container 32. The hopper assembly 30 may then be coupled to the volumetric measuring and dispensing device 16 without the bulk material 4 spilling from the hopper assembly 30. The first air vent tubes 14, 14' are coupled to the hopper assembly 30 by running one end 33 of the tubes 14, 14' through the hopper 34 and sealing the tubes 14, 14' to the hopper 34. The end 33 of the first air vent tubes 14, 14' is curved downwardly to prevent bulk material 4 from entering the tubes 14, 14'. When the hopper assembly 30 is coupled to the volumetric measuring and dispensing device 16 the level of the bulk material 4 should be below the end 33 of the air vent tubes 14, 14' which are fluidly coupled with the hopper 34 (see FIGS. 1 and 3).

In the preferred embodiment, the hopper assembly 30 further includes an agitator assembly 40 (see FIGS. 3 and 4). The agitator is used to disturb the dense bulk material 4 in the hopper 34 for facilitating the flow of the bulk material 4 into the volumetric measuring and dispensing device 16. In a preferred embodiment, the agitator includes a circular plate 42 having a handle 44 for rotating the circular plate 42 and agitator tines 41 fixed to the plate 42 and extending into the hopper 34 for movement in the bulk material (see FIG. 4).

The circular plate 42 is mounted beneath the hopper 34 and has slots 47 for receiving bolts 46 which couple the hopper 34 to the agitator assembly 40. The slots 47 extend around a portion of the circular ring 42 for limiting the rotation of the ring 42 and agitator tines 41. Preferably, plate contains three slots 47 each extending approximately 60 degrees along the circular ring 42 and three bolts or pins 46 slidably received in the respective slots 47 for limiting the rotation of the agitator to approximately 60 degrees.

In the preferred embodiment, the hopper assembly further includes a closure assembly 50 which retains the bulk material 4 in the hopper 34 prior to coupling the hopper assembly to the volumetric measuring and dispensing device 16. The closure assembly 50 is mounted beneath the agitator assembly 40 and is positioned proximate a top region of the volumetric measuring and dispensing device 16 when the hopper assembly 30 is coupled to the volumetric measuring and dispensing device 16.

The closure assembly 50 includes a slide closure 54 having an opening 55 which must align with an opening 51 in a plate 52 positioned beneath the slide 54 in order for the bulk material to be dispensed into the volumetric measuring and dispensing device 16. In the closed position, as shown in FIG. 5, the opening 55 does not align with the opening 51 and the bulk material 4 is prevented from being dispensed from the hopper assembly 30. In a preferred embodiment, the slide closure 54 is sandwiched between two plates 52 (see FIG. 3) and a foam lining material on both sides of the slide closure 54 prevents the particulates of the bulk material 4 from collecting on the slide closure 54 and escaping to the surrounding area. Preferably, the lining is a foam-like lining having a ribbed surface, such as a synthetic fabric having an open-cell neoprene foam backing with an adhesive.

The closure assembly 50 further includes mechanisms for preventing the accidental opening of the slide closure 54 and the accidental discoupling of the hopper assembly 30 while the slide closure 54 is in the open position. The slide 54 has an aperture 58 which receives a pin 59 while the slide 54 is in the closed position to prevent the slide closure 54 from opening without removing the pin. The slide 54 also includes a slot 57 which receives the head 56 of a threaded bolt 53. The slot 57 includes a first end 57a which is smaller than the head of the threaded bolt 53 and a second end 57b which is larger than the head 56 of the threaded bolt. The threaded bolt 53 is threaded into the volumetric measuring and dispensing device 16 and when the slide 54 is in the closed position the head 56 of the threaded bolt 53 can be received through the slide closure assembly 50 and slide 54 for coupling and discoupling the hopper assembly 30 to the volumetric measuring and dispensing device 16. When the hopper assembly 30 is coupled to the measuring and dispensing device 16 and the slide closure 54 is in the open position, the head 56 of the threaded bolt 53 is over the first end 57a of the slot 57 and this prevents the hopper assembly 30 from being decoupled from the volumetric measuring and dispensing device 16.

In one embodiment of the present invention, the cylindrical bulk material receiver member 60 has a single measuring chamber 64 of a predetermined volume. The measuring chamber 64 is formed as a hollowed out cavity in the cylindrical member 60 (see FIGS. 6 and 7). In an alternative embodiment, the volume of the measuring chamber 64 may be varied, such as by placing blocks 66 into the bottom of the hollowed out cavity in the cylindrical member 60, as shown in FIG. 6. Another alternative embodiment includes two measuring chambers 64a, 64b formed in a cylindrical bulk material receiver member 60, as shown in FIG. 8. In this embodiment, the first measuring chamber 64a may be receiving and measuring a predetermined volume of bulk material in a first position while the second measuring chamber 64b is dispensing a predetermined volume of bulk material. The cylindrical bulk material receiver member may then be moved to a second position where the second measuring chamber 64b receives and measures the predetermined volume of bulk material and the first measuring chamber 64a is dispensing the predetermined volume of bulk material.

In a preferred embodiment, the cylindrical bulk material receiver member 60 includes a spindle 61 which is rotatably mounted in the block 18 of the volumetric measuring and dispensing device 16 and end portions 62 rotatably mounted in bearings 96a, 96b, such as oilite bearings (see FIG. 9). The inside surfaces of the block 18 and the bearings 96a, 96b are lined with liners 92, 94 for preventing bulk material from escaping from the measuring and dispensing device 16 and/or contaminating the bearings. Preferably, the liner is a foam-like material having a ribbed surface, such as a synthetic fabric having an open-cell neoprene foam backing with an adhesive. The liners 92, 94 contact the outer surface of the spindle 61 and the ribbed surface of the liner cleans the outer surface of the spindle 61 as the dispensing mechanism 15 rotates the cylindrical receiver member 60.

Many modifications of the presently disclosed invention will become apparent to those skilled in the art with the benefit of the foregoing description.

What is claimed is:

1. A bulk material measuring and dispensing system comprising:

a volumetric measuring and dispensing device, for measuring a predetermined volume of bulk material and for dispensing said predetermined volume of bulk material, said volumetric measuring and dispensing device including a top and bottom region and at least one measuring chamber having a predetermined volume disposed between said top and bottom region;

a bulk material dispensing passageway positioned adjacent said bottom region of said volumetric measuring and dispensing device, for receiving said bulk material from said at least one measuring chamber, and for dispensing said predetermined volume of bulk material into a bulk material receiver;

a dispensing mechanism, coupled to said volumetric measuring and dispensing device, and movable between at least a first and a second position, said first position for allowing said at least one measuring chamber to receive and volumetrically measure said bulk material, said second position for allowing said at least one measuring chamber to dispense said volumetrically measured bulk material to said bulk material dispensing passageway;

a hopper assembly coupled to said top region of said volumetric measuring and dispensing device and including a hopper for holding said bulk material and positioning said bulk material above said volumetric measuring and dispensing device; and at least a first air vent extending from and fluidly coupling said measuring chamber to an exterior region of said at least one measuring chamber, for facilitating displacement of air in said measuring chamber.

2. The bulk material measuring and dispensing system of claim 1, wherein said at least a first air vent includes a measuring chamber vent extending from said at least one measuring chamber to said hopper assembly.

3. The bulk material measuring and dispensing system of claim 2, wherein said measuring chamber vent includes at least a first measuring chamber vent tube fluidly coupling said at least one measuring chamber to said hopper assembly, said at least a first measuring chamber vent tube including a first end coupled to said hopper and extending to a region which is above a level of said bulk material, and a second end fluidly coupled to said at least one measuring chamber.

4. The bulk material measuring and dispensing system of claim 3, wherein said measuring chamber vent includes a second measuring chamber vent tube, said second measuring chamber vent tube fluidly coupling said at least one measuring chamber to said hopper assembly, said second measuring chamber vent tube disposed in a region of at least one said measuring chamber opposite a region in which said at least a first measuring chamber tube is disposed.

5. The bulk material measuring and dispensing system of claim 1, wherein said at least a first air vent includes a dispensing passageway vent, said dispensing passageway vent including at least a first dispensing passageway vent tube extending from and fluidly coupling said bulk material dispensing passageway to said at least one measuring chamber, for facilitating displacement of air in said bulk material receiver adapted to be positioned proximate said bulk material dispensing passageway.

6. The bulk material measuring and dispensing system of claim 5, wherein said dispensing passageway vent includes a second dispensing passageway vent tube, said second dispensing passageway vent tube fluidly coupling said bulk material dispensing passageway to said at least one measuring chamber, said second dispensing passageway vent tube disposed in a region of said at least one measuring chamber opposite a region which said at least a first dispensing passageway vent tube is disposed.

7. The bulk material measuring and dispensing system of claim 1, wherein said hopper assembly includes a bulk material container coupled to said hopper.

8. The bulk material measuring and dispensing system of claim 1, wherein said hopper assembly further includes a slide closure movable between an open and a closed position, in said closed position for retaining said bulk material in said hopper assembly, and in said open position, for allowing said bulk material to enter said volumetric measuring and dispensing device.

9. The bulk material measuring and dispensing system of claim 1, wherein said volumetric measuring and dispensing device includes a cylindrical member rotatably mounted in said volumetric measuring and dispensing device, and wherein said measuring chamber is formed in said cylindrical member, and wherein said cylindrical member is rotatable by said dispensing mechanism from said first position where said at least one measuring chamber receives and volumetrically measures said bulk material to said second position where said at least one measuring chamber dispenses said bulk material to said bulk material dispensing passageway.

10. The bulk material measuring and dispensing system of claim 8, wherein said hopper assembly is removably coupled to said volumetric measuring and dispensing device.

11. The bulk material measuring and dispensing system of claim 7, wherein said bulk material container is removably coupled to said hopper.

12. The bulk material measuring and dispensing system of claim 1, wherein said bulk material dispensing passageway is a tapered spout.

13. The bulk material and dispensing system of claim 1, wherein said hopper includes a tapered portion.

14. The bulk material measuring and dispensing system of claim 1, wherein said hopper assembly includes an agitator, for facilitating the flow of said bulk material to said volumetric measuring and dispensing device.

15. The bulk material measuring and dispensing system of claim 1, wherein said at least one measuring chamber includes a first measuring chamber and a second measuring chamber, in said first position said first measuring chamber receives and volumetrically measures said bulk material and said second measuring chamber dispenses a predetermined volume of said bulk material, and in said second position said second measuring chamber receives and volumetrically measures said bulk material and said first measuring chamber dispenses a predetermined volume of said bulk material.

16. The bulk material measuring and dispensing system of claim 1, further including a bulk material receiver base for holding said bulk material receiver proximate said bulk material dispensing passageway, said bulk material receiver base being spring-loaded to push said bulk material receiver against said bulk material dispensing passageway.

17. A bulk material measuring and dispensing system comprising:

- a volumetric measuring and dispensing device, for measuring a predetermined volume of bulk material and for dispensing said bulk material, said volumetric measuring and dispensing including a top and bottom region;

- a cylindrical bulk material receiver member having at least one measuring chamber and rotatably mounted in said volumetric measuring and dispensing device, said cylindrical bulk material receiver member having a first position for receiving and volumetrically measuring said predetermined volume of bulk material and a second position for dispensing said predetermined volume of bulk material, wherein said cylindrical bulk material receiver member in said first position is fluidly coupled to said volumetric measuring and dispensing device for venting air from said cylindrical bulk material receiver member to said volumetric measuring and dispensing device when receiving said predetermined volume of bulk material;

- a bulk material dispensing passageway positioned adjacent said bottom region of said volumetric measuring and dispensing device for receiving said predetermined volume of bulk material from said at least one measuring chamber, and for dispensing said predetermined volume of bulk material into a bulk material receiver, wherein said cylindrical bulk material receiver member in said second position is fluidly coupled to said bulk material dispensing passageway for venting air from said cylindrical bulk material receiver member to said bulk material dispensing passageway when dispensing said predetermined volume of bulk material;

- a dispensing mechanism for rotating said cylindrical bulk material receiver member for said first position where said measuring chamber receives and volumetrically measures said predetermined volume of bulk material, to said second position where said measuring chamber dispenses said predetermined volume of bulk material through said bulk material dispensing passageway; and

- a hopper assembly including a hopper coupled to said top region of said volumetric measuring and dispensing device for receiving and holding said bulk material and positioning said bulk material above said volumetric measuring device.

18. The bulk material measuring and dispensing system of claim 17, wherein an inside surface of said volumetric measuring and dispensing device includes a liner, for contacting said cylindrical bulk material receiver member rotatably mounted in said volumetric measuring and dispensing device and for preventing said bulk material from escaping from said volumetric measuring and dispensing device.

\* \* \* \* \*